(12) United States Patent
Dauber et al.

(10) Patent No.: US 7,291,208 B2
(45) Date of Patent: Nov. 6, 2007

(54) GROOVED ACTIVE AND PASSIVE ADSORBENT FILTERS

(75) Inventors: Edwin George Dauber, Chesapeake City, MD (US); Earl R Ball, Middletown, DE (US); Thomas E. Finan, Wilmington, DE (US); Darlene K. Gorton, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 231 days.

(21) Appl. No.: 10/918,764

(22) Filed: Aug. 13, 2004

(65) Prior Publication Data

US 2006/0032372 A1 Feb. 16, 2006

(51) Int. Cl.
*G11B 33/14* (2006.01)
*B01D 53/04* (2006.01)

(52) U.S. Cl. .......................... 96/134; 96/139; 55/385.6; 360/97.02

(58) Field of Classification Search ............. 360/97.02, 360/97.03, 97.04; 95/45, 90; 96/4, 131, 96/134, 135, 139, 152, 153, 154; 55/385.4, 55/385.6, DIG. 39
See application file for complete search history.

(56) References Cited

U.S. PATENT DOCUMENTS

| | | | |
|---|---|---|---|
| 3,953,566 A | 4/1976 | Gore ...................... 264/288 |
| 4,633,349 A | 12/1986 | Beck et al. ................ 360/97 |
| 4,830,643 A | 5/1989 | Sassa et al. ............... 55/316 |
| 4,857,087 A | 8/1989 | Bolton et al. ............. 55/385.6 |
| 4,863,499 A | 9/1989 | Osendorf .................... 55/316 |
| 4,902,423 A | 2/1990 | Bacino .................. 210/500.36 |
| 4,985,296 A | 1/1991 | Mortimer, Jr. ............. 428/220 |
| 5,030,260 A | 7/1991 | Beck et al. .................. 55/316 |
| 5,124,856 A | 6/1992 | Brown et al. ............ 360/97.03 |
| 5,406,431 A | 4/1995 | Beecroft .................. 360/97.02 |
| 5,417,743 A | 5/1995 | Dauber ........................ 96/13 |
| 5,447,695 A | 9/1995 | Brown et al. ............... 422/171 |
| 5,500,038 A | 3/1996 | Dauber et al. .............. 96/135 |
| 5,538,545 A | 7/1996 | Dauber et al. .............. 96/153 |
| 5,593,482 A | 1/1997 | Dauber et al. .............. 96/135 |
| 5,997,614 A | 12/1999 | Tuma et al. ..................... 96/4 |
| 6,128,159 A * | 10/2000 | Ino ........................ 360/97.02 |
| 6,146,446 A | 11/2000 | Tuma et al. ..................... 95/90 |
| 6,214,095 B1 * | 4/2001 | Logan et al. ................ 96/147 |
| 6,238,467 B1 | 5/2001 | Azarian et al. ............. 96/135 |
| 6,266,208 B1 | 7/2001 | Voights ................... 360/97.02 |
| 6,296,691 B1 | 10/2001 | Gidumal ....................... 96/17 |
| 6,395,073 B1 * | 5/2002 | Dauber ........................ 96/134 |
| 6,475,270 B1 * | 11/2002 | Graeve ........................ 96/135 |
| 6,491,741 B2 | 12/2002 | Tuma et al. ..................... 95/90 |
| 6,683,746 B1 | 1/2004 | Kuroki et al. ........... 360/97.02 |

(Continued)

FOREIGN PATENT DOCUMENTS

JP 4-323007 11/1992

*Primary Examiner*—Frank M. Lawrence
(74) *Attorney, Agent, or Firm*—Richard W. Ellis

(57) ABSTRACT

The invention relates to a device for filtering contaminants, such as particulates and vapor phase contaminants, from a confined environment such as electronic or optical devices susceptible to contamination (e.g. computer disk drives) by improving performance and possibly incorporating multiple filtration functions into a unitary filter. Filtration functions include a passive adsorbent assembly and can include a combination of inlet, or breather filter and adsorbent filter. Moreover, recirculation filter, diffusion tube, and outside mount functions can be added to the filter depending on desired functionality within the enclosure.

66 Claims, 15 Drawing Sheets

U.S. PATENT DOCUMENTS 6,712,887 B2 3/2004 Ueki et al. .................... 96/134
2003/0047078 A1* 3/2003 Ueki et al. .................... 96/135
2003/0056653 A1* 3/2003 Ueki et al. .................... 96/134

* cited by examiner

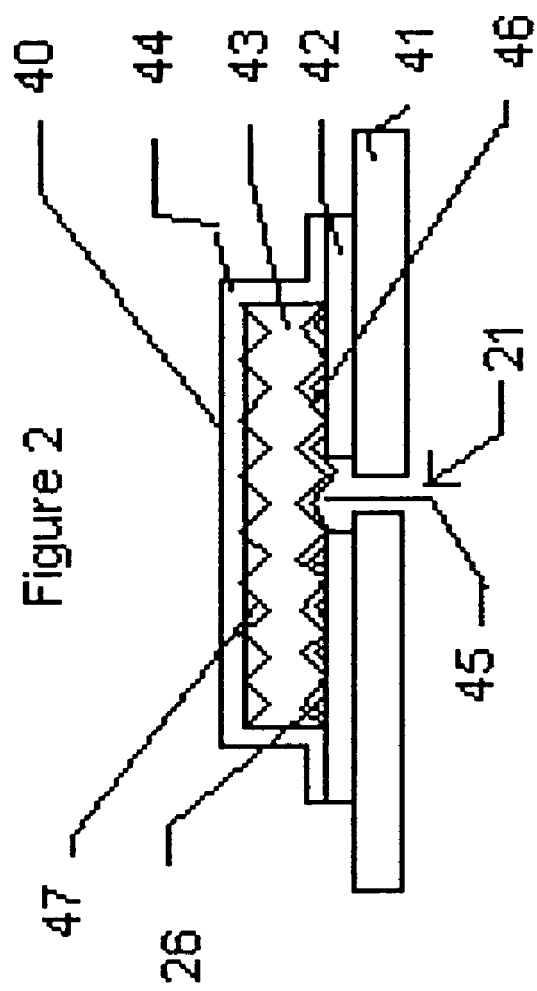

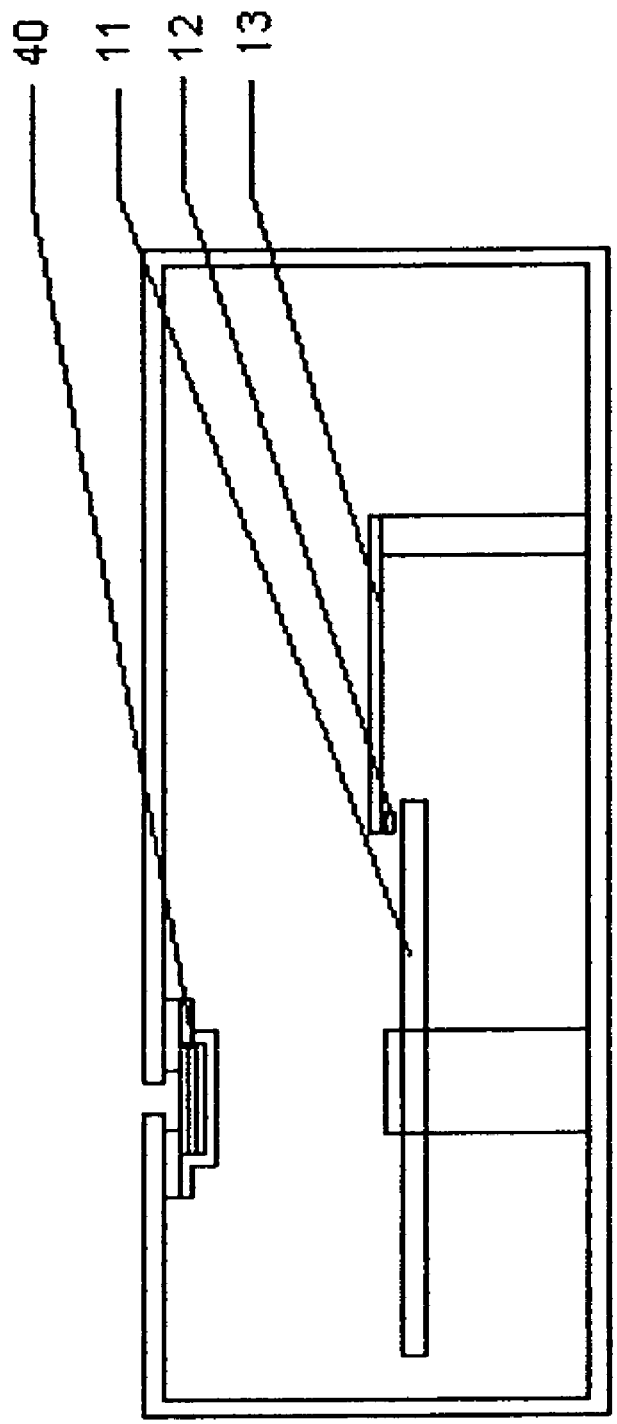

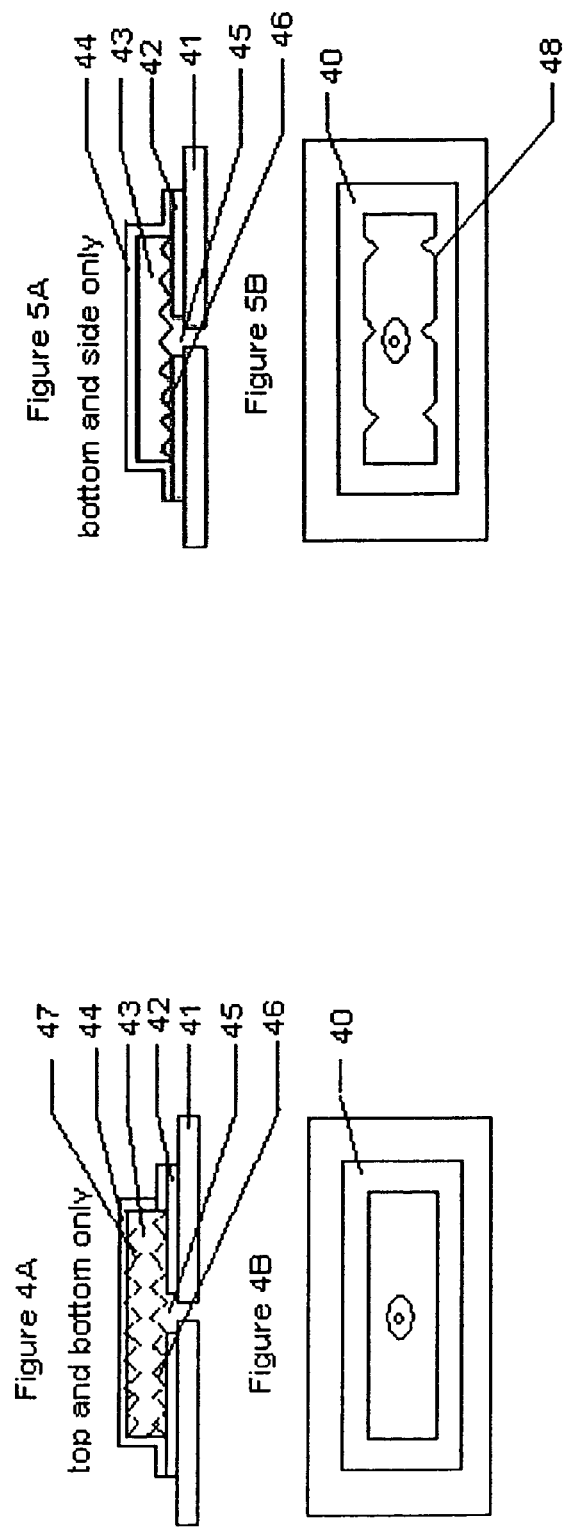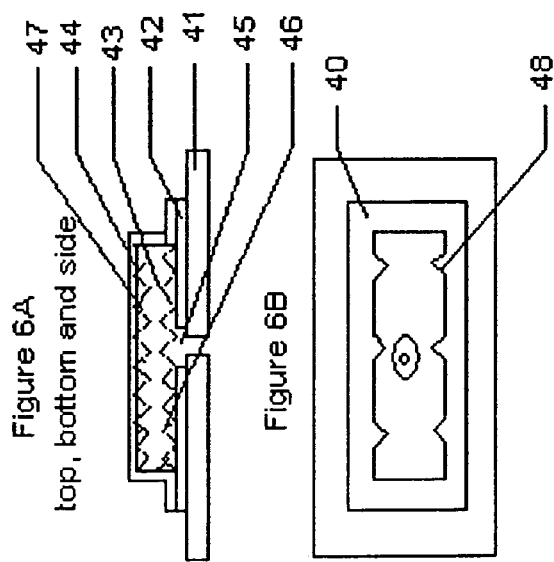

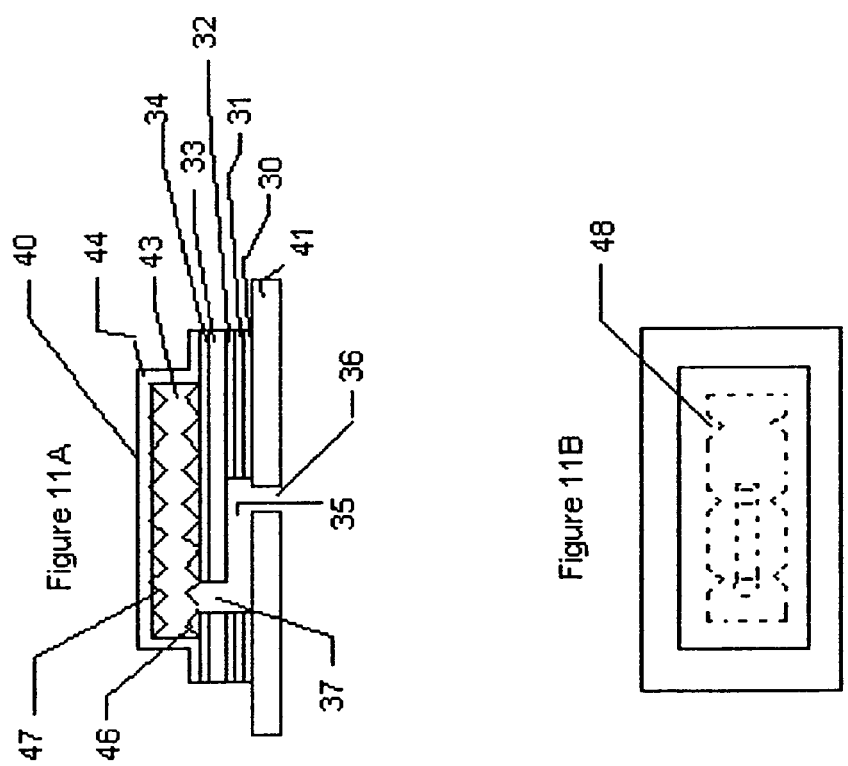

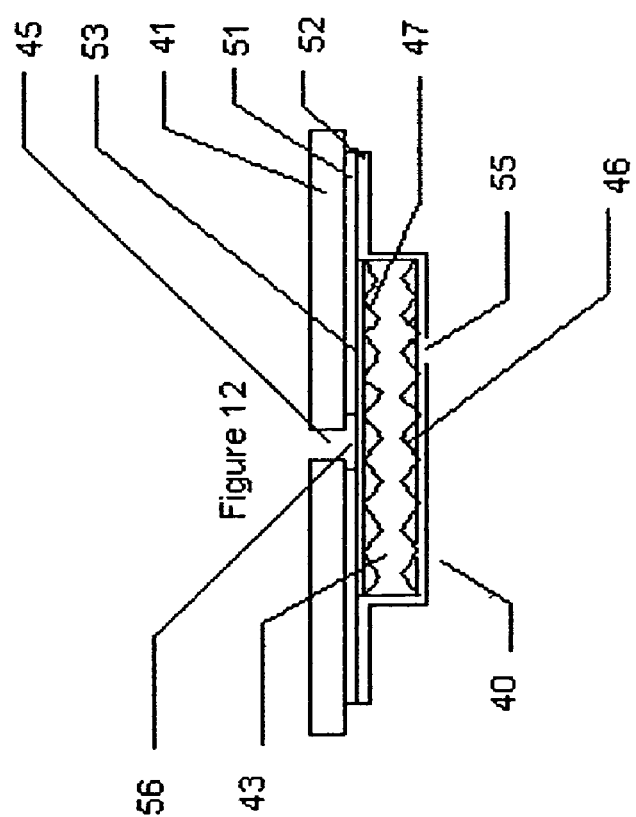

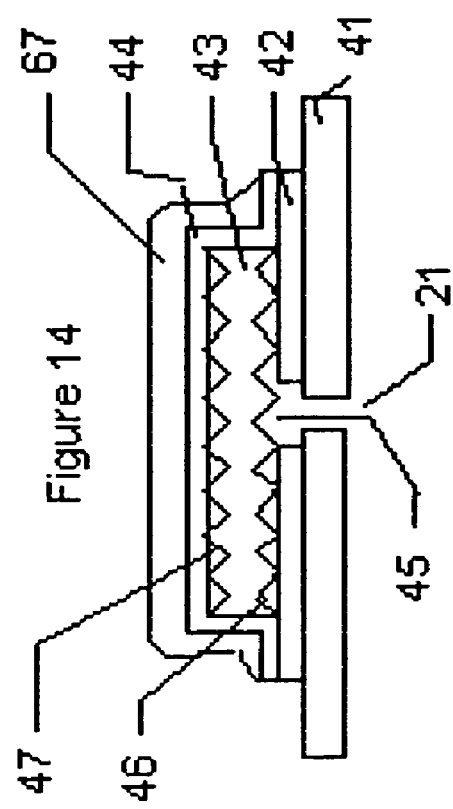

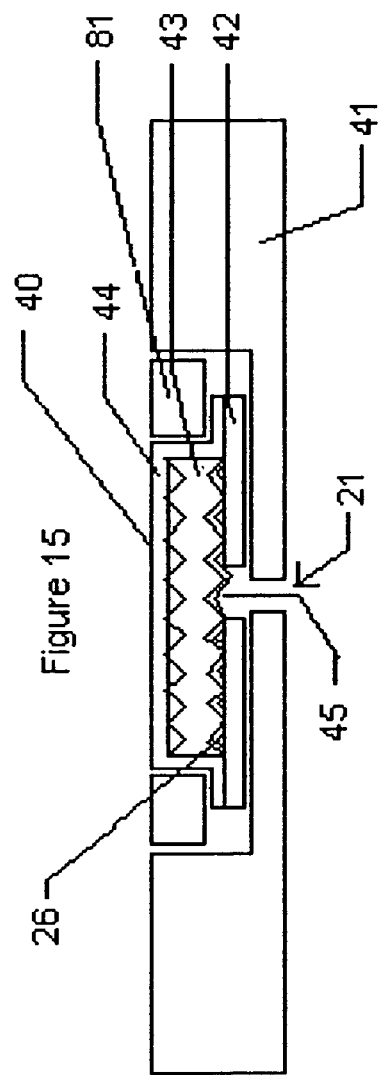

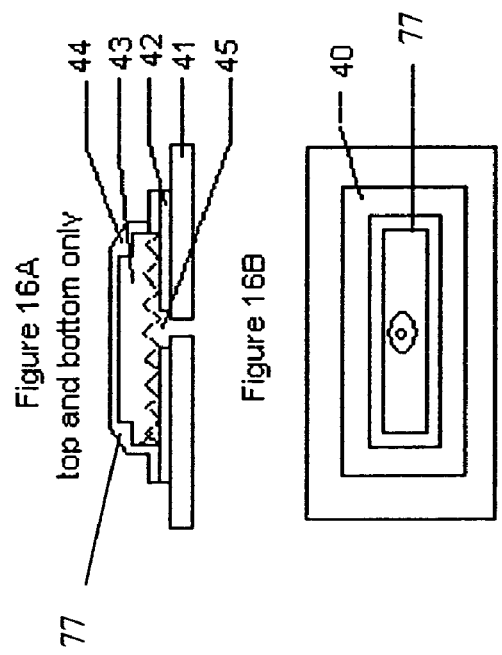

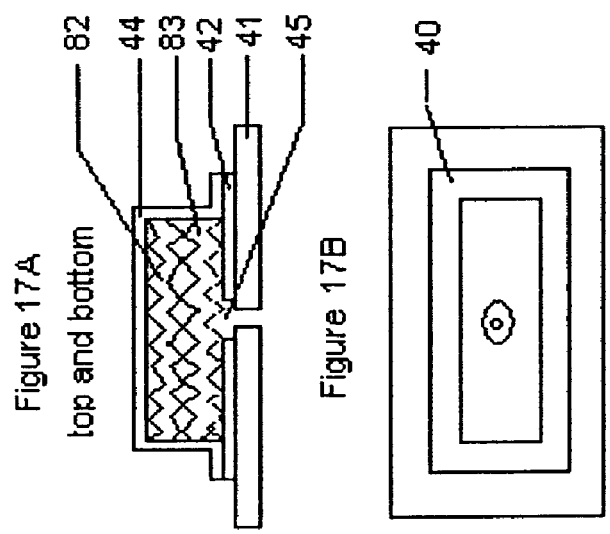

GROOVED ACTIVE AND PASSIVE ADSORBENT FILTERS

FIELD

This invention relates to a device for filtering contaminants, such as particulates and vapor phase contaminants, from a confined environment such as electronic or optical devices susceptible to contamination (e.g. computer disk drives). Specifically, the filter assembly filters contaminates that are generated from within the device and optionally from inlet air into the device.

BACKGROUND

Many enclosures that contain sensitive equipment must maintain very clean environments in order for the equipment to operate properly. Examples include enclosures for the following: optical surfaces or electronic connections that are sensitive to particulates and gaseous contaminants which can interfere with mechanical, optical, or electrical operation; data recording devices, such as computer hard disk drives that are sensitive to particles, organic vapors, moisture and corrosive vapors; processing of thin films and semiconductor wafers; and electronic controls such as those used in automobiles and industrial applications that can be sensitive to particles, moisture buildup and corrosion as well as contamination from fluids and vapors. Contamination in such enclosures originates from both inside and outside the enclosures. For example, in computer hard drives, damage may result from external contaminates as well as from particles and vapors generated from internal sources. The terms "hard drives" or "hard disk drives" or "disk drives" or "drives" will be used herein for convenience and are understood to include any enclosure for equipment or material that is sensitive to contamination.

Disk drives must be protected against a large number of contaminants that are found in the surrounding environment and can penetrate the drive. This is particularly true for drives that are removable and portable to any environment such as disk drives that are used in laptop computers or in Personal Computer Memory Card International Association (PCMCIA) slots, or other drives which may not be used in the typical data processing environment. Drives used in applications such as gaming systems, personal video recorders, automotive mapping systems and others must survive in environments that are more severe than that of standard desk top computer applications.

Contamination may occur in various forms. For example, disk drives are susceptible to corrosive ions, such as chlorine and sulfur dioxides, and may also be sensitive to variations in humidity. Accordingly, an array of failure mechanisms exist. One serious contamination-related failure mechanism in computer disk drives is static friction or "stiction." Stiction results from the increased adhesion of a drive head to a disk while the disk is stationary plus increased viscous drag parallel to the head-disk interface. Newer high-density disks are more sensitive to contamination-caused stiction because they are smoother and include relatively thin layers of lubricants. Contaminants on the disk change the surface energy and increase the adhesive forces between the head and disk, causing stiction. Also, stiction may be caused by vapors condensing in the gap between the head and disk. The low energy low torque motors that are being used in smaller disk drives for portable computers and the low noise drives used in other applications, such as personal video recorders, are increasingly sensitive to stiction related failures.

Another serious contamination-related failure mechanism is a head crash. Head crashes can occur when particles get into the head-disk interface. The spacing or flying heights between the head and disk during operation of modern high density drives is 30 nanometers or less. As rotational speed affects the maximum data transfer rate a drive can have, rotational speed of modern disk drives is increasing. Some current drives operate at 15,000 revolutions per minute and future drives will likely use even higher speeds. With such high speeds and low flying heights, even submicron-sized particles can be a problem, causing the head to crash into the particle or the disk after flying over a particle, bringing the drive to an abrupt failure mode. Particles can also adversely affect data integrity and mechanical reliability of a drive, sometimes referred to as thermal asperity.

Disk Drives are also susceptible to variances in humidity. Low humidity is problematic either because it may increase static electricity or decrease lube thickness or functionality. However, in high humidity, corrosion is promoted and lubricants may swell. It takes significantly more adsorbent to protect a drive from humidity than it does from organic or acid gas contamination. Thus drives that need buffering from humidity fluctuations require significant amounts of adsorbent.

To prevent contamination-related failure, a variety of filtration devices have been used. For example, filtration devices to keep particles from entering disk drives are well known. Some consist of a filtration media held in place by a housing of polycarbonate, acrylonitrile butadiene styrene (ABS), or some other material. Others consist of a filtration media in the form of a self-adhesive disk utilizing a layer or layers of pressure sensitive adhesive. Such filters are mounted and sealed over a vent hole in the enclosure to filter particulates from the air entering the drive. Filtration performance depends not only on the filter media having a high filtration efficiency but also on having it have a low resistance to airflow or pressure drop. If the pressure drop is too high, unfiltered air will leak into the enclosure through a gasket, screw hole, or other seam instead of entering through the filter. Such filters may work well for particulates of external origin, but do not address the problems from vapor phase contaminants.

Internal particulate filters, or recirculation filters, are also well known. These filters are typically pieces of filter media, such as expanded PTFE membrane laminated to a polyester nonwoven backing material. Other recirculaiton filters are "pillow-shaped" filters containing electret (i.e., electrostatic) filter media. These filters may be pressure fit into slots or "C" channels and are placed in an active air stream such as near the rotating disks in a computer hard disk drive or in front of a fan in electronic control cabinets, etc. Alternatively, the recirculation filter media can be framed in a plastic frame. Recirculation filters work well for particulate removal of internally generated particles but do not address the problem of vapor phase contaminants, nor do they provide protection from external particles entering the drive.

Internal adsorbent filters are also well known. One example is described in U.S. Pat. No. 4,830,643 issued to Sassa et al. This patent teaches a sorbent filter where a powdered, granular or beaded sorbent or sorbent mixture is encapsulated in an outer expanded PTFE tube. This filter is manufactured by W. L. Gore & Associates, Inc., Elkton, Md., and is commercially available under the trademark GORE-SORBER® module. A second well known internal adsorbent assembly is described in U.S. Pat. No. 5,593,482 issued to Dauber et al. A third internal adsorbent assembly incorporates a layer of adsorbent such as activated carbon/

PTFE composite between two layers of filter media or is alternately wrapped in a layer of filter media and can be installed between slots or "C" channels much the way a recirculation filter is installed but without significant airflow through the filter. Such a filter is described in U.S. Pat. No. 5,500,038 issued to Dauber et al.

Known internal adsorbent filters work well at adsorbing vapor phase contaminants, but they do not filter particulates very well. They may collect particles by some impaction of particles onto the filter (i.e., by having the larger particles impacting or colliding with the adsorbent filter as particle-laden air speeds around the filters) or by diffusion of particles onto the filter. However, these filters do not perform nearly as well as the standard recirculation filters, which work by a combination of sieving (mechanically capturing particles too large to pass through the pore structure of the filter), impaction (capturing particles too large to follow the bending air streams around filters or the fibers of the filter), interception (capturing particles that tend to follow the air streams, but are large enough to still intercept a filter fiber or in other words those particles with a diameter equal to or less than the distance between the fiber and the air stream line), and diffusion (capturing smaller particles buffeted about by air molecules in a random pattern and coming into contact with a filter fiber to become collected).

Because there is a need to remove vapor phase contaminates as well as particles from both internal and external sources, combination sorbent breather filters were developed. These can be made by filling a cartridge of polycarbonate, ABS, or similar material with sorbent and securing filter media on one or both ends of the cartridge and placing the cartridge over a hole in the container wall. These filters effectively cleanse incoming air of particles and vaporous contaminates, and internal air of internally generated vaporous contaminates. Because the filters are inside, the drive contaminate will diffuse into the adsorbent sections of the filters. Examples of such filters are described in U.S. Pat. No. 4,863,499 issued to Osendorf (an anti-diffusion chemical breather assembly for disk drives with filter media having a layer impregnated with activated charcoal granules); U.S. Pat. No. 5,030,260 issued to Beck et al. (a disk drive breather filter including an assembly with an extended diffusion path; U.S. Pat. No. 5,124,856 issued to Brown et al. (a unitary filter medium with impregnated activated carbon filters to protect against organic and corrosive pollutants); and U.S. Pat. No. 5,447,695 issued to Brown et al. (Chemical Breather Filter Assembly). Unfortunately, many of these designs are too large and take up too much space in today's miniaturized drives.

A second combination adsorbent breather filter is also well known that encapsulates the adsorbent material such as an impregnated activated carbon polytetrafluoroethylene (PTFE) composite layer between two layers of filter media and is applied over a hole in the enclosure with a layer or layers of pressure sensitive adhesive. These filters work well to an extent and are of a size that can be used in today's small drives and are typically designed to filter air coming into the drive. Thus, the adsorbent is typically primarily designed to adsorb both organic and corrosive vapors from the outside environment and will filter particulates only from air coming into or leaving the drive. Internally generated vapors and moisture can be adsorbed by these filters, but often times they have been used in conjunction with another larger internal adsorbent filter so the adsorbent breather filter can be smaller in size. Therefore, such filters may not contain enough adsorbent to adequately adsorb all the internally generated contaminants and typically will not contain enough adsorbent to control humidity well within the drive as previously mentioned. Again, particles are also generated inside the drive and are not typically captured by these filters.

Another well known combination filter is an adsorbent recirculation filter that adds an adsorbent layer inside the before mentioned recirculation filter. These can filter particles and vapors once inside the drive but do not limit particles and vapors from coming into the drive. As such it allows the incoming contaminants an ability to contact a drive head or disk before being collected by the filter.

Additionally, to adsorb corrosive compounds such as chlorine and sulfur dioxide, an adsorbent is typically treated with a salt to chemisorb the contaminants. However, when known filters are washed in deionized water, large amounts of these salts may be released, which makes them unacceptable in sensitive disk drive environments.

A washable adsorbent recirculation filter is described in U.S. Pat. No. 5,538,545 issued to Dauber et al., wherein expanded PTFE membranes or other hydrophobic materials are used to encapsulate the adsorbent. However, these filters do not filter air as it comes into the drive before it has had a chance to deposit particles and do damage to the drive.

Combinations of several filters having different functions in a single drive have been taught. For example, U.S. Pat. No. 5,406,431, to Beecroft, describes a filter system for a disk drive that includes an adsorbent breather and recirculation filter in specifically identified locations within the drive. Also, U. S. Pat. No. 4,633,349, by Beck et al., teaches a disk drive filter assembly comprising a dual media drum type filter element in a recirculating filter assembly that surrounds a breather filter. Further, U.S. Pat. No. 4,857,087 to Bolton et al., teaches incorporating a breather filter in a recirculation filter housing, but has significantly more parts and incorporates a third filter element complete with housings, apertures, and gaskets to accomplish this inclusion. The combinations described in these patents either locate the filter components in separate regions of the disk drive or incorporate space-consuming fixtures to orient the component parts within the drives.

Space saving combinations having further multifunctionality have also been taught. These include U.S. Pat. No. 6,266,208 to Voights integrating a recirculation filter, breather filter, and adsorbent filter into a single unitary filter; U.S. Pat. No. 6,238,467 to Azarian et. al incorporating a breather filter, adsorbent filter, and recirculation filter into a rigid assembly filter; U.S. Pat. No. 6,296,691 to Gidumal incorporating a breather filter adsorbent filter and recirculation filter into a molded filter; and U.S. Pat. No. 6,395,073 to Dauber incorporating the recirculation filter and breather filter with optional adsorbent filter into a low profile adhesive construction. All but the last filter design by Dauber are filters of considerable size and are not appropriate for smaller drives like the 2.5" laptop drives and smaller 1.8" drives, 1.0" drives and 0.85" drives that are currently in the market and/or in design.

As disk drives have become smaller and less expensive, there is a need for simplification and the reduction in the number of parts in a drive to reduce cost and improve performance. However, as the drives increase in recording data density and capacity, they become more sensitive to particulate and vaporous contamination including increased sensitivity to moisture.

Existing filtration means often do not meet these demanding filtration requirements. The low profile adsorbent breather filters and low profile multifunction filters best suited in size to fit these smaller drives have had to compromise in adsorbent content because they needed airflow through the filter. The compromise has been to either use very dense adsorbent media and have limited airflow, or use less dense adsorbent media to maintain airflow but then have limited adsorbent capacity. Two recent inventions have tried to overcome this deficiency. U.S. Pat. No. 6,683,746 to Kuroki et. al. allows for air by-pass of the adsorbent media to increase airflow, but can have performance reductions in adsorption if too much air by-passes the adsorbent media. U.S. Pat. No. 6,712,887 to Ueki et. al. uses grooves in the adsorbent media to increase airflow, but this has limited functionality as there are further limitations to airflow through the filtration layer unaddressed.

SUMMARY

In one aspect, the invention is an adsorbent assembly for removing contaminants within an enclosure comprising an adhesive; an adsorbent media having a bottom surface, a top surface, and at least one side surface; and a filter media covering the adsorbent, wherein the filter media is adjacent to the top surface and at least one side surface of the adsorbent and the adsorbent includes at least one groove. In this aspect, the at least one groove is preferably at least about 1 mil (0.025 mm) deep, more preferably at least about 5 mil (0.127 mm) deep, most preferably at least about 10 mils (0.254 mm) deep.

In another aspect, the invention is an adsorbent breather filter for removing contaminants within an enclosure having a fluid inlet/outlet port comprising: an adhesive; an adsorbent media having a bottom surface, a top surface, and at least one side surface, the adsorbent media in fluid communication with the port; and a filter media covering the adsorbent, wherein the filter media is adjacent to the top surface and at least one side surface of the adsorbent media and the adsorbent media includes at least one groove adjacent to the filter media. In this aspect, the at least one groove is preferably at least about 1 mil (0.025 mm) deep, more preferably at least about 5 mils (0.127 mm) deep, most preferably at least about 10 mils (0.254 mm) deep.

In still another aspect, the invention provides an adsorbent having a bottom surface adjacent to a layer of adhesive.

In yet another aspect, the invention provides a filter media comprising a porous polymeric membrane. In this aspect the porous polymeric membrane is preferably hydrophobic, more preferably, the porous polymeric membrane comprises PTFE membrane.

In another aspect, the invention provides a filter that includes an electret particle filtering layer disposed on a porous polymeric membrane.

In another aspect the invention provides a filter media comprising an electret filtering layer.

In still another aspect, the invention provides an adsorbent media comprising PTFE and an adsorbent material. In this aspect, the adsorbent media preferably comprises a PTFE membrane filled with an adsorbent material.

In yet another aspect, the invention provides a molded adsorbent media.

In a further aspect, the invention provides an adsorbent media including a non-woven fabric impregnated with an adsorbent.

In another aspect, the invention provides an adsorbent media including a granular material disposed on at least one side of a fiber scrim.

In still another aspect, the invention provides an adsorbent media including a physisorbent. In this aspect, the physisorbent is preferably selected from the group consisting of activated carbon; activated alumina; molecular sieves; silica gel and combinations thereof.

In yet another aspect, the invention provides an adsorbent media comprises a chemisorbent. In this aspect, the chemisorbent is preferably a material impregnated with at least one material selected from the group consisting of potassium permanganate, calcium carbonate, potassium carbonate, potassium hydroxide, sodium carbonate and calcium sulfate; and combinations thereof.

In a further aspect, the invention provides an adsorbent media having a bottom surface, a top surface and at least one side surface wherein the adsorbent media includes at least one groove on a side surface, the top surface or the bottom surface of the adsorbent media.

In another aspect, the invention provides an adsorbent assembly or breather filter including two or more grooves. In this aspect, the grooves may be parallel, form a radial pattern or intersect.

In still another aspect, the invention provides an adsorbent assembly or breather filter, wherein the adsorbent media comprises two or more layers.

In yet another aspect, the invention provides an adsorbent assembly or breather filter, in which the adsorbent includes a first layer having at least one groove and a second layer adjacent to the first layer, the first and second layers positioned such that the at least one groove of the first layer is adjacent to the second layer. In this aspect, the second layer may include at least one groove and the first and second layers may be positioned such that the at least one groove of the first layer faces the at least one groove of the second layer.

In a further aspect, the invention provides an adsorbent assembly or breather filter having an adsorbent comprising a first and second layer, in which the first and second layers include grooves forming peaks and valleys and the first and second layers are positioned such that the valleys of the first layer overlap the peaks of the second layer.

BRIEF DESCRIPTION OF THE DRAWINGS

The operation of the present invention should become apparent from the following description when considered in conjunction with the following drawings, in which:

FIG. 2 is a side cross-sectional view of an embodiment of the filter unit of the present invention as it would appear on the enclosure housing;

FIG. 3 is a side cross-sectional view of a computer hard disk drive showing an embodiment of the filter unit of the present invention installed therein;

FIGS. 4A, 4B are side cross-sectional and top views, respectively, of an embodiment of the filter unit of the present invention having grooves on the top and bottom surfaces of the adsorbent layer;

FIGS. 5A and 5B are side cross-sectional and top views, respectively, of another embodiment of the filter unit of the present invention having grooves on the side and bottom sides of the adsorbent layer;

FIGS. 6A and 6B are side cross-sectional and top views, respectively of another embodiment of the filter unit of the present invention having grooves on the top, bottom, and sides of the adsorbent layer;

FIGS. 11A and 11B are side cross-sectional and top views respectively of another embodiment of the present invention including a diffusion tube within the construction of the filter element.

FIG. 12 is a side cross-sectional view of another embodiment of the present invention showing the filter element in an outside mount configuration.

FIG. 14 is a side cross-sectional view of another embodiment including a recirculation filter included within the filter construction;

FIG. 15 is a side cross sectional view of another embodiment with a filler or gasket around the filter that is countersunk into the drive baseplate such that the assembled filter and gasket are level with the drive baseplate.

FIG. 16 is a side cross-sectional and top view of another embodiment where a top perimeter groove is used along with bottom grooves.

FIG. 17 is a side cross-sectional view of another embodiment in which the adsorbent comprises multiple layers of adsorbent material with grooves of the two layers facing each other.

DETAILED DESCRIPTION

Figure 1:
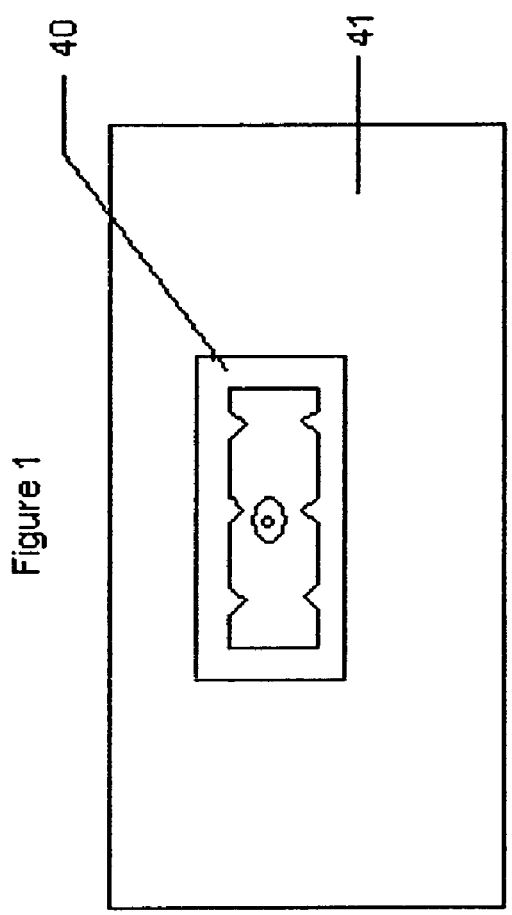
FIG. 1 is a top view of an embodiment of the filter unit of the present invention as it would be located on a drive housing.

The adsorbent assembly filters and adsorbent breather filters of the present invention include a grooved adsorbent layer, an adhesive, and a filter layer covering the adsorbent. As used herein, an adsorbent assembly filter is a filter adapted to remove contaminants from an enclosure. As used herein, an adsorbent breather filter is an adsorbent filter adapted to be used in an enclosure having an opening or port, such that the filter removes at least some contaminants from the air coming into the filter. Grooves on the surfaces of the adsorbent improve filter performance. The filter layer is adjacent to the top and at least one side of the grooved adsorbent. Preferably, the adhesive includes an adhesive layer for attaching the filter to the drive.

The present invention consolidates filtration functions which were often performed by two, three, or more filters into a single filter that functions well, is easy to install, is clean and cleanable. Moreover, as one of skill in the art will readily appreciate, further components, such as a gasket or gasket(s) or vibration dampening materials, can be included to further reduce the number of components required for final assembly. Common to all embodiments of the invention is the highly dense adsorbent media grooved on at least one surface and often times on multiple surfaces to allow good air access and airflow while maintaining maximum adsorbent capacity and good adsorbent performance.

The filter may comprise a layer or layers of adhesive to attach the filter to the proper location on the interior or exterior of the drive enclosure wall. The filter may optionally cover an inlet diffusion tube or channel in the drive housing, or the filter may fully contain a diffusion tube. A layer of filter media to filter the incoming air of particles is provided in substantially laminar relation to the adhesive. An optional layer or layers of filter media can be provided to filter recirculating air. A layer or layers of adsorbent media with grooves on multiple surfaces is provided between the adhesive and filter layers, or between filter media layers, to filter one or both of the incoming and recirculating air streams of vaporous contaminants. Appropriate partitioning of the filter is provided to permit flow channels for inlet air and for recirculating air without the possibility of allowing unfiltered inlet air through the filter.

The adsorbent may comprise one or more layers of 100% adsorbent materials, such as granular activated carbon, or may be a filled product matrix such as a scaffold of porous polymeric material compounded with adsorbents that fill the void spaces. Other possibilities include adsorbent impregnated nonwovens or adsorbent beads on a scrim where the non-woven or scrim may be cellulose or polymeric and may include latex or other binders as well as porous castings or tablets of adsorbents and fillers that are polymeric or ceramic. The adsorbent can also be a mixture of different types of adsorbents, fillers, and binders.

Suitable adsorbents include: physisorbers (e.g. silica gel, activated carbon, activated alumina, molecular sieves, etc.); chemisorbers (e.g. potassium permanganate, potassium carbonate, potassium hydroxide, potassium iodide, calcium carbonate, calcium sulfate, sodium carbonate, sodium hydroxide, calcium hydroxide, powdered metals or other reactants for scavenging gas phase contaminants); as well as mixtures of these materials. For some applications, it may be desirable to employ multiple layers of adsorbent materials, with each layer containing different adsorbents to selectively remove different contaminants as they pass through the filter or as they may be exposed from inside the enclosure.

Preferably the adsorbent utilizes an adsorbent-filled PTFE sheet wherein adsorbent is entrapped within the reticular PTFE structure as taught by U.S. Pat. No. 4,985,296 issued to Mortimer, Jr. and specifically incorporated herein by reference. Most preferably, particles are packed in a multi-modal (e.g. bi-modal or tri-modal) manner with particles of different sizes interspersed around one another to fill as much of the available void space between particles as is possible, so as to maximize the amount of active material contained in the core. This technique also allows a number of sorbents to be filled into a single layer. The core can then be Compressed or layered and compressed to maximize adsorbent loading and density. Previously air flow was required through the adsorbent and expanding of the material was required to allow for airflow, but with this invention the material can be compressed and grooved on multiple surfaces to allow for good airflow, good adsorbent performance and maximum adsorbent loading and density.

Another preferred embodiment of the adsorbent layer that can be used in the present invention is discussed in detail in Japanese Laid-Open Patent Application (Kokai) Number 4-323007.

In one aspect, the adsorbent includes grooves forming depressions or valleys in the surface of the adsorbent. The valleys contrast with the peaks, which project from the surface of the adsorbent. As used herein, a peak or valley may be of any shape resulting from the grooving of the adsorbent. For example, grooves may be square, elliptical, triangular or any other shape without departing from the invention. Groove size and pattern may also be varied according to the application. Groove patterns may include, without limitation; parallel, radial and crossing or intersecting patterns.

In one aspect, the adsorbent may comprise multiple layers. The layers may include one or more layers including grooves. The grooved layers may be positioned so that the grooved surfaces of one layer are adjacent, or opposite the grooved surface of another layer. Alignment of grooves in adjacent layers can be random, aligned or unaligned. Groove size may vary between adsorbent layers. For example, the adsorbent may comprise two layers, each layer including square grooves. The square grooves may be aligned, such that the peaks of the first adsorbent layer align with the valleys of the second adsorbent layer.

In the embodiments described and illustrated herein, the adhesive is typically a mounting adhesive layer mounting the filter to the enclosure wall. However, the adhesive layer may have different constructions. It can be either a single layer of transferable adhesive, a single sided adhesive coated onto a carrier or substrate such as polyester or polyethylene, or a double-sided adhesive coated onto a carrier or substrate as described within the illustrations. A preferred adhesive utilizes a high peel strength of greater than 30 ounces/inch as measured by PSTC #1 (Pressure Sensitive Tape Council), low outgassing of less than 0.1% collected volatile condensable material (CVCM) as measured by ASTM-E595-84, solvent-free non-particulating permanent acrylic pressure sensitive adhesive. A double-sided adhesive tape may also be preferred for certain constructions because it is easier to handle, and the substrate adds support and rigidity to the filter construction. A commercially available adhesive satisfying these requirements is 3M 444 adhesive, available from Minnesota Mining & Manufacturing in Minneapolis, Minn. Other adhesives, such as hot melt adhesives, UV curable adhesives, thermosets, thermoplastics, or other curable or activatable adhesives etc. are also suitable. Furthermore, if a diffusion tube is desired, adhesives as described in U.S. Pat. No. 5,417,743 can be used. In many of the applications described herein that incorporate a diffusion tube, a second adhesive layer is superimposed over the first. This second layer could again be just adhesive, but a single-sided (i.e., adhesive on one side of a carrier or substrate) or double-sided adhesive is preferred for ease in handling and processing.

Prior to attachment to the disk drive housing, the exposed adhesive layers may have one or more release liners adhered thereto to protect the adhesive and to facilitate handling of the filters. The release liners would typically be removed prior to assembly of the filter onto the disk drive enclosure.

PTFE membrane filter materials can be used to cover the adsorbent material and act as filtration membranes. One such preferred filter media to encapsulate the adsorbent layer is a layer of expanded PTFE membrane made in accordance to U.S. Pat. No. 4,902,423 issued to Bacino et al. incorporated by reference. This filter media may be structurally supported by a layer of woven, nonwoven, or expanded porous material, such as polyester, polypropylene, polyamide, etc. This filter media has several advantages. It can be made very highly permeable, with resistances to air flow of less than 0.5 mm $H_2O$ @ 10.5 feet per minute (3.2 meters per minute) and still contain adsorbent particulate within the filter.

The particle filtration efficiency of this highly expanded membrane as measured on a TSI 8160 efficiency test rig available from TSI Inc., in Minnesota, is also very good (e.g. in excess of 55% at 0.3 µm) which provides good particle filtration along with the adsorbent containment. A preferred support layer is a Reemay 2014 polyester nonwoven, 1.0 oz/yd$^2$ available from Reemay, Inc., Old Hickory, Tenn.

A second preferred filter media to cover or encapsulate the adsorbent layer, and more preferably to be used in the embodiments with a recirculation filter is a layer of an electrostatic triboelectret material available in finished filter form from W. L. Gore and Associates, Inc. under the trademark GORE-TRET® recirculation filters. An illustrated example of this would be layer 67 in FIG. 14. Advantages of this media are that it is very high in efficiency (e.g., in excess of 90% @ 0.3 micron) and also very permeable (e.g., less than 1 mm $H_2O$ at 10.5 fpm or 3.2 m/min). While this media loses its charge while being washed with deionized water, it immediately regains its efficiency upon drying due to the triboelectric effect of the mix of dissimilar fibers.

Other filter materials can also be used. They could be other electrets or other triboelectret materials that yield high efficiencies and low resistances to airflow. They could also be other filter papers or filter membranes such as polypropylene membranes or cast polymeric membranes or some combination of filter materials. Different filter materials with different properties can be used in the different embodiments of the invention wherever filter layers are used and/or optionally used depending upon the required performance needed.

An outer protective layer can also be used to add durability to the filter and to contain any protruding fibers from either the triboelectret type filter media or the filter support media for the membrane filter media. Typically, this would be an extruded or expanded plastic material such as polypropylene, polyethylene, polyamide, polyester, etc. A preferred material is a Delnet 0707 expanded polypropylene material available from DelStar Technology, Inc., Middletown, Del.

Using PTFE membranes as a filter material over the adsorbent layers imparts a number of additional advantages to this improved filter construction. First, PTFE is hydrophobic. Some adsorbents used in the industry use a water-soluble salt to impregnate a physical adsorbent such as activated carbon to provide a chemical adsorbent with a large active surface area. However, the water-soluble chemisorbent salts are removed if the filter is washed. By covering the carbon layer with the PTFE membrane, the final part is waterproof and washable; water can come into contact with the part and not penetrate the adsorbent.

Washability is important because ionic contamination is a major concern for corrosion susceptible apparatus such as computer disk drives. Ions of concern, such as chlorine and sulfur dioxide, are readily soluble in water, so washing with deionized water has become routine for many components used within a drive. Also, reworking of drives that initially fail certification is common in the industry and often washing the drive housing is included in reworking. Thus, embodiments utilizing PTFE filter layers to encapsulate the adsorbent allow use of water soluble, salt treated adsorbents and can withstand washing without losing adsorbent effectiveness. And reworking can be done without having to remove the adsorbent filter from the housing. This washability is accomplished by using hydrophobic filter materials (along with impermeable layers such as adhesives, etc.) to surround the adsorbent layers. "Hydrophobic" as used in this application means the filter materials have a water (or water with surfactant if one is used) entry pressure sufficient to withstand the conditions of conventional washing steps, such as heating, stirring, ultrasonics, etc.

While the PTFE membranes mentioned above are hydrophobic and can be washed, they also have a high vapor transmission rate, which allows contaminants in the air to quickly and easily diffuse through the membranes into the adsorbents. PTFE membranes can also be made with very good filtration efficiencies, which is especially beneficial in the breather filter and adsorbent breather filter applications. An exemplary membrane could be made in accordance with U.S. Pat. No. 3,953,566. Such a membrane can have a filtration efficiency of 99.97% at 0.3 microns sized particles and a permeability or face velocity of 7 feet/minute (3.56 cm/sec) at 0.5 inches (1.27 cm) of water pressure. The membrane is commercially available in finished filter form from W. L. Gore and Associates, Inc.

Additionally, PTFE is a non-linting, non-outgassing inert binder that can be used as an adsorbent binder by mechanically entrapping adsorbent particles within the PTFE material. This entrapment effectively reduces dusting of adsorbent material during the manufacture and during the life of the filter. This material can also be made in a relatively thin, highly loaded material as described in U.S. Pat. No. 4,985,296. The PTFE/adsorbent composite can be made in thicknesses from less than 0.001" to 0.400" or more prior to grooving. This allows a great deal of flexibility in finished filter thicknesses and adsorbent loading. Additionally, sorbent densities approximating 80-95% of full density are possible with multi-model packing and physical compression, so that maximum adsorbent material can be packed per unit volume. Unlike binders such as acrylics, melted plastic resins, etc., PTFE does not block the adsorbent pores.

The present invention consolidates filtration functions which were often performed by two, three, or more filters into a single filter that functions well, is easy to install, is clean and cleanable. Additionally, further components, such as a gasket or gasket(s) or vibration dampening materials, can be included to further reduce the number of components required for final assembly. Common to embodiments of the invention is a highly dense adsorbent media grooved on one or multiple surfaces to allow good airflow and or adsorbent access to the contaminants while maintaining maximum adsorbent capacity and good adsorbent performance.

The present invention provides a compact, clean, low outgassing (i.e., typically less than 20,000 ng/g at 85° C. for four hours), low particulating (i.e., typically less than 50 one hundred micron sized particle per square centimeter when tested with a liquid particle counter), unitary adsorbent assembly or breather filter and also, optionally, can be washable, particularly if the filter comprises hydrophobic PTFE membranes. The invention can utilize any suitable adsorbent type and be tailored for preferential performance in filtering of air from both internal and external sources for particles as well as hazardous vapor contaminants. As a single unit, the multi-functional filter minimizes installation time, as compared to the use of several conventional parts to achieve the required filtration and adsorption. The filter can further be combined with an optional diffusion tube to improve the performance of the breather component. The filter can still further be combined with a gasket to provide a means of sealing the disk drive. The multi-functional filters of the present invention can be used in filters where air is driven by normal convection, by diffusion means, by an auxiliary fan, or some combination thereof.

A diffusion tube can be included with the adsorbent breather filter as described in U.S. Pat. No. 5,417,743 by Dauber and U.S. Pat. No. 5,997,614 by Tuma et. al. Diffusion tubes provide additional protection against vaporous contaminants (including moisture) entering the drive through the breather opening by providing a diffusion barrier in the form of the diffusion tube which creates a tortuous or a longer path for air to travel before entering the drive enclosure. Diffusion tubes reduce the number of contaminants reaching the interior of the enclosure (and/or the adsorbent depending on the location of the filter) and increase the humidity time constants or time required to reach humidity equilibrium with the environment. As used herein, for convenience, the term "diffusion tube" may refer to either a conventional tortuous path or it may refer to a non-tortuous cavity into which incoming air passes before entering the filter.

Further embodiments of the invention allow for the filter to be mounted to the outside surface or from the outside as opposed to the usual inside or internal mounting of the filters. This can be for either the adsorbent assembly or the assorbent breather filter functions.

Referring to FIG. 1, there is shown a top perspective view of one embodiment of the multi-functional filter assembly 40 of the present invention as it would appear looking down on the filter mounted to an interior wall of a drive enclosure housing 41. FIG. 2 shows a side cross-sectional view of another embodiment of a filter assembly 40 of the present invention as it would appear mounted on a disk drive enclosure housing 41. The air stream path is indicated as 21. The adhesive layer 42 mounts the filter 40 to the housing 41 and has a hole or opening 45 to allow the air stream through the adhesive layer. Layer 44 is the filter media. Layer 43 is the adsorbent. In this embodiment, the adsorbent 43 is a single layer adsorbent with grooves on the top surface 47 and bottom surface 46. As used herein, bottom of the adsorbent is the side closest to or facing the opening. The top is opposite the bottom. A second optional filter media layer 26 is located such that the filter media encapsulates the adsorbent 43 Such a construction is desirable for adsorbents which may particulate because the filter media prevents such particulation from entering the drive during installation. Moreover, if the filter media is hydrophobic, the filter is washable.

FIG. 3 shows additional features of a computer hard disk drive into which the filter assembly of FIG. 1 has been incorporated. Additional components typically present within a drive are shown, such as the rotating magnetic recording disks 11, the read/write heads 12 and the armatures 13 for moving the heads. The rotating disks 11 are the driving force for circulating, or recirculating, air within the disk drive.

FIGS. 4A and 4B show a side cross-sectional and top view respectively of one embodiment of having the grooves on multiple surfaces, here shown as having grooves on the top and bottom surfaces. As shown in FIG. 4A, the filter 40 comprises a layer of adhesive 42 with hole 45 cut through it. Superimposed on the adhesive layer 42 is an adsorbent layer 43, with grooves on top 47 and bottom 46 surfaces. A filtration layer 44 covers the adsorbent layer and is adhered to the adhesive layer 42.

It should be apparent to one of skill in the art that the adhesive may comprise a pressure sensitive adhesive layer, a double-sided adhesive tape on a backer material or multiple sided adhesive on multiple backers, depending on the desired construction of the filter. The adhesive may also comprise a heat sensitive or UV or other curable adhesive layer. The hole 45 is aligned with a hole in the enclosure, such that air will enter the drive housing through the enclosure hole and the hole 45 in the adhesive layer 42. The air will then pass along the bottom grooves in the adsorbent layer and either pass through the filter layer 44 or along the sides of the adsorbent media and then further along the grooves in the top of the adsorbent media before passing through the filter media 44.

FIGS. 5A and 5B show side cross-sectional and top view respectively, of another embodiment of the filter assembly 40 where there are grooves on the bottom 46 and side 48 surfaces. The layers are similar to those shown in FIGS. 4A and 4B.

FIGS. 6A and 6B show a side cross-sectional and top views respectively of another embodiment with grooves on the top 47, bottom 46, and side 48 surfaces. Again the layers are defined similarly to the way they were defined for FIGS. 4A and 4B respectively.

Figure 7:
FIG. 7 is a side cross-sectional view of a top and bottom point aligned groove pattern embodiment of the adsorbent layer of the present invention.
Figure 8:
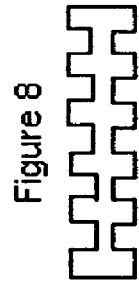
FIG. 8 is a side cross-sectional view of a top and bottom square aligned groove pattern embodiment of the adsorbent layer of the present invention.
Figure 9:
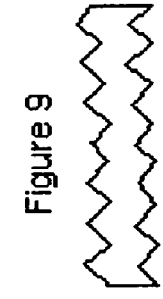
FIG. 9 is a side cross-sectional view of a top and bottom point unaligned groove pattern embodiment of the adsorbent layer of the present invention
Figure 10:
FIG. 10 is a side cross-sectional view of a top and bottom wavy unaligned groove pattern embodiment of the adsorbent layer of the present invention.

FIGS. 7, 8, 9, and 10 show a few of the possible groove patterns for the adsorbent layer when grooves are used on the top and bottom surfaces. These by no means exhaust the possibilities, but are shown for illustrative purposes. In each figure the grooves in the adsorbent form peaks and valleys. FIG. 7 shows a point-aligned pattern in the grooves. FIG. 8 shows a square aligned pattern in the grooves. FIG. 9 shows a point unaligned pattern in the grooves and FIG. 10 shows a wavy unaligned pattern in the grooves. Additional patterns are easily envisioned and mixtures of patterns such as aligned top point and bottom square patterns can be used.

FIGS. 11A and 11B show a side cross-sectional view and a top view respectively of another embodiment of the present invention where a diffusion tube is included with the adsorbent breather filter 40. Layers 30, 31, and 32 are a double-sided adhesive where layers 30 and 32 are adhesive coated onto the carrier layer 31. The adhesive and carrier layers 30, 31, and 32 have a hole or slot 35 cut through them that will be aligned at one end with a hole 36 in the disk drive enclosure wall 41. Layers 33 and 34 form a single sided adhesive layer, with layer 34 being the adhesive on a carrier layer 33. These are superimposed over layer 32 with hole 37 cut through them and superimposed over the end portion of hole 35 which is opposite the end that is aligned over hole 36. Adsorbent layer 43 is an adsorbent layer in this case with grooves on top 47 and bottom 46 and side 48 superimposed over hole 37 and extending further over part of layer 34. Layer 44 is a filter layer, such as of a high efficiency membrane for good breather filtration efficiency, which covers adsorbent layer 43 and is adhered to adhesive layer 34

FIG. 12 is a side cross-sectional view of another embodiment of the present invention that is an outside mount version of the invention. Here filter 40 mounts on the outside of the enclosure wall 41 instead of the inside as previously shown. Layer 51 is an adhesive layer that may be only adhesive or a double sided adhesive layer as previously detailed that has hole 56 cut through it and is placed over the vent hole 45 of the enclosure wall 41. Filter layer 53 is against the adhesive layer 51 and may be laminated or adhered to the adsorbent layer 43 and filters incoming air of particulates and retains the carbon particles from entering the drive. Adsorbent layer 43 is shown with grooves on top 46 and on bottom 47. Layer 52 is an air impermeable layer that protects the carbon from the environment and retains the carbon. Filter 40 removes contaminates from the air within the drive via access through openings 56 and 45 and from the air passing through hole 55 in the impermeable layer 52 and further through the filter into the drive interior. The hole 55 may be offset from holes 45 and 56, but need not be. The outside mount filter is shown here as mounting on a flush enclosure wall 41, but the enclosure wall 41 could also be recessed and the filter mounted such that when installed, the filter outside surface may be flush with the outside wall surface. In such cases it may be possible to have the impermeable layer 52 optionally mounted on the outer wall surface instead of the filter itself. Furthermore optional filter layers may be inserted such as between the adsorbent layer 43 and the impermeable layer 52 if desired by use of lamination of layers together or by using additional adhesive or adhesive layers.

Figure 13A:
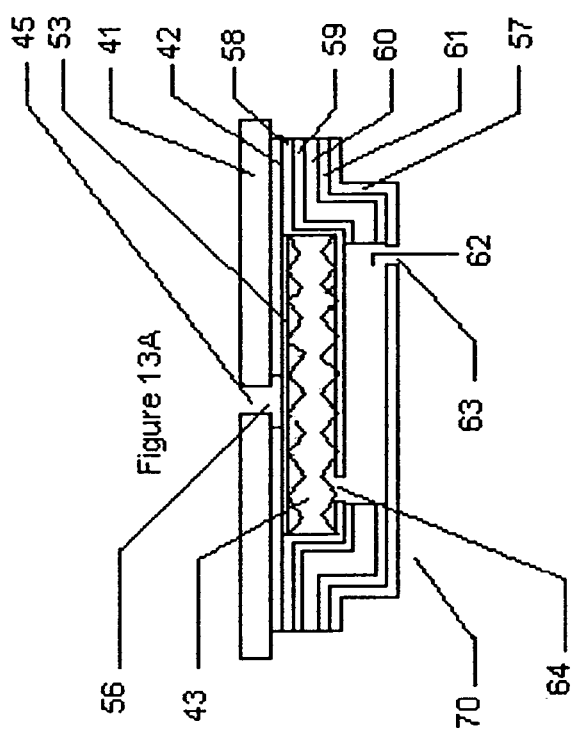
FIGS. 13 and 13B are side cross-sectional and top views respectively of another embodiment of the present invention showing the filter in an outside mount configuration with a diffusion tube within the construction of the filter element.
Figure 13B:
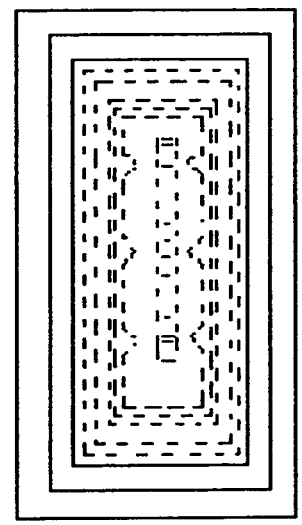

FIGS. 13A and 13B are side cross-sectional and top views respectively of an additional embodiment of the present invention where the filter is mounted on the outside of the enclosure wall similar to the FIG. 12 embodiment, but also has built in diffusion tube characteristics similar to the FIGS. 11A and 11B embodiment. Filter 70 is applied to the outside of enclosure surface 41. Adhesive layer 42 again can be a layer of adhesive or a double sided adhesive layer with hole 56 cut in it and applied such that hole 56 aligns with hole 45 in the enclosure wall 41. Filter layer 53 is against the adhesive layer 42 to filter the incoming air of particulates and retains the carbon particles of the adsorbent layer 43, which in this illustration has top, bottom, and side grooves. Layer 58 is an impermeable layer over the adsorbent layer 43. It could optionally have adhesive on either side for aiding assembly of the filter. For instance if it has adhesive on the side facing adhesive layer 51, then adhesive layer 51 could have optionally been a single sided adhesive. Hole 64 is cut through the layer 58 to allow airflow to pass from the exterior to the carbon and eventually into the enclosure. Layers 59, 60, and 61 are a double-sided adhesive with layers 59 and 61 being adhesive on both sides of the carrier 60. Hole or slotted hole 62 is cut through layers 59, 60, and 61 and aligns one end with hole 64 through the impermeable layer 58. Impermeable layer 57 then is placed on layer 61. Optionally layer 61 could be an adhesive layer on the impermeable layer 57 and layers 59 and 60 could have been a single sided adhesive, again showing flexibility of construction possibilities. Hole 63 is cut in impermeable layer 57 and aligns with hole or slot 62 aligning at the opposite end of the hole or slot as hole 64 aligned.

FIG. 14 is a side cross-sectional view of an alternative embodiment of the present invention with a recirculation filter included as part of the construction. The construction of this illustration is the same as was used in FIG. 2 except that another filter layer 67 is placed over filter layer 44. Filter layer 67 is typically a more open layer to allow more airflow through the layer to have increased performance to clean air passing through it of particles. As the disks inside a drive spin, air is recirculated around inside the drive and such open filtration layers are typically used as a recirculation filter to clean the inside of the enclosure of particles. Optionally layers 44 and 67 could be combined into a single layer that is both open enough to allow recirculating air to flow through it to clean it of particles and efficient enough to clean the incoming air sufficiently of particles. One possible media of construction for layer 67 is an electret material.

FIG. 15 is a side cross-sectional view of another embodiment of the present invention which is similar to that shown in FIG. 2, where now a filler or gasket 81 is placed over the filter that is countersunk into the enclosure wall such that the resultant filter and gasket are flush mounted into the enclosure. This can be of value to minimize the filter's disturbance to airflow and to minimize the space the filter takes up inside the enclosure. Both these can be important particularly for high revolution per minute disk drives and for very small disk drives.

FIGS. 16A and 16B are cross-sectional and top views respectively of another embodiment of the invention similar to FIGS. 4A and 4B, except where the adsorbent layer 43 has a perimeter top groove 77.

FIGS. 17A and 17B are cross-sectional and top views respectively of a further embodiment of the invention again similar to FIGS. 4A and 4B where the adsorbent layer 43 is replaced by multiple adsorbent layers, in this case layers 82 and 83.

It should be clear to one skilled in the art that these illustrations are by no means exhaustive in how such a filter can be assembled and how combinations of the various filter enhancements can be combined in the filter construction.

Different materials can also be used as the impermeable layer shown in FIGS. 12 and 13. Polymer layers such as polyester, polypropylene or the like can be used as well as metallized polymer layers such as a metallized polyester. A preferred impermeable layer is a layer of thin aluminum. More preferably the impermeable layer is dead soft aluminum because it is impermeable, formable, and provides a good electromagnetic shield. For example, a 0.003" thick dead soft aluminum layer as sold by ALL FOILS Brooklyn Heights, Ohio, is appropriate for use in the invention.

Test Procedures

Airflow Test:

Airflow was tested by making a fixture where the filter of the invention could be adhered over a hole in the fixture. The size of the hole in the fixture was 0.08" (0.203 cm) in diameter. Air was delivered to the back side of the filter through a port (to allow air to flow through the hole in the mounting adhesive and through the filter). Another port on the fixture was placed to measure back pressure or the pressure required to flow a given volume of air through the filter. The filters were all tested at an airflow rate of 30 ml/min. Various filter constructions could then be tested and compared for airflow.

Adsorption Rate Test:

Adsorption rate was measured by placing an equal number of samples of comparative parts in identical jars suspended over an identical amount of an organic compound. For the test one sample was suspended over 50 ml of TMP (trimethylpentane) in 500 ml jars and weighed every fifteen minutes for two hours. The weight gain was recorded and the weight gain per unit time was graphed and calculated.

Without intending to limit the scope of the present invention, the following examples illustrate how the present invention may be made and used.

EXAMPLE 1

Samples were made to test for resistance to airflow. Each sample was made using a commercially available double sided acrylic adhesive from Adhesive's Research in Glenn Rock, Pa. The adsorbents were all filled PTFE having 240 mg of activated carbon and made in accordance to U.S. Pat. No. 4,985,296. The adsorbent layers were further compressed to form 15 mil grooves as described in the detailed description section of this patent. The filter layers were 0.2 micron rated PTFE membranes as made and supplied in finished filters by W. L. Gore and Associates, Newark Del. The filters were placed on the airflow test fixture as described above and tested. The following configurations were tested: Inventive Example 1 was similar to FIG. 4A and had grooves on both the top surface and the bottom surface of the adsorbent. Comparative Example 1 had grooves on only the bottom surface of the adsorbent. Inventive Example 2 was similar to FIGS. 5A and 5B and had grooves on only the bottom and sides of the adsorbent; finally, Inventive Example 3 was similar to FIGS. 6A and 6B and had grooves on the top, bottom and side surfaces. The filters were all tested as per the above outlined airflow test protocol. The results are contained in Table 1.

TABLE 1

| Example | Location of Grooves | Resistance to Flow (mm H$_2$O) |
|---|---|---|
| Comparative Ex. 1 | Bottom only | 34.0 |
| Inventive Example 1 | Bottom and Top | 7.1 |
| Inventive Example 2 | Bottom and Sides | 4.3 |
| Inventive Example 3 | Bottom, Top and sides | 2.8 |

The results show that adding grooves to a second side or to multiple additional sides can significantly improve or lower the resistance to airflow through the filter which means more air will easily pass through the filter for pressure equilibration. Thus the air entering the enclosure will be filtered of both particulates and vaporous contaminants instead of bypassing the filter and entering via a lower pressure leak path.

EXAMPLE 2

Figure 18:
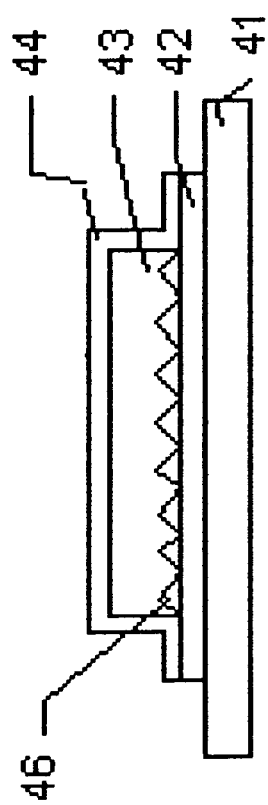
FIG. 18 is a cross sectional view of another embodiment in which the adsorbent assembly has a grooved bottom surface without airflow through the filter.
Figure 19:
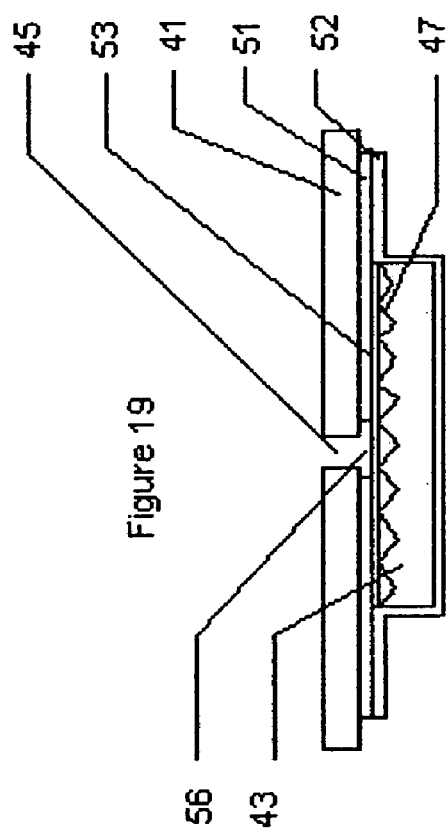
FIG. 19 is a cross sectional view of an outside mounted adsorbent assembly with a grooved bottom surface.
Figure 20:
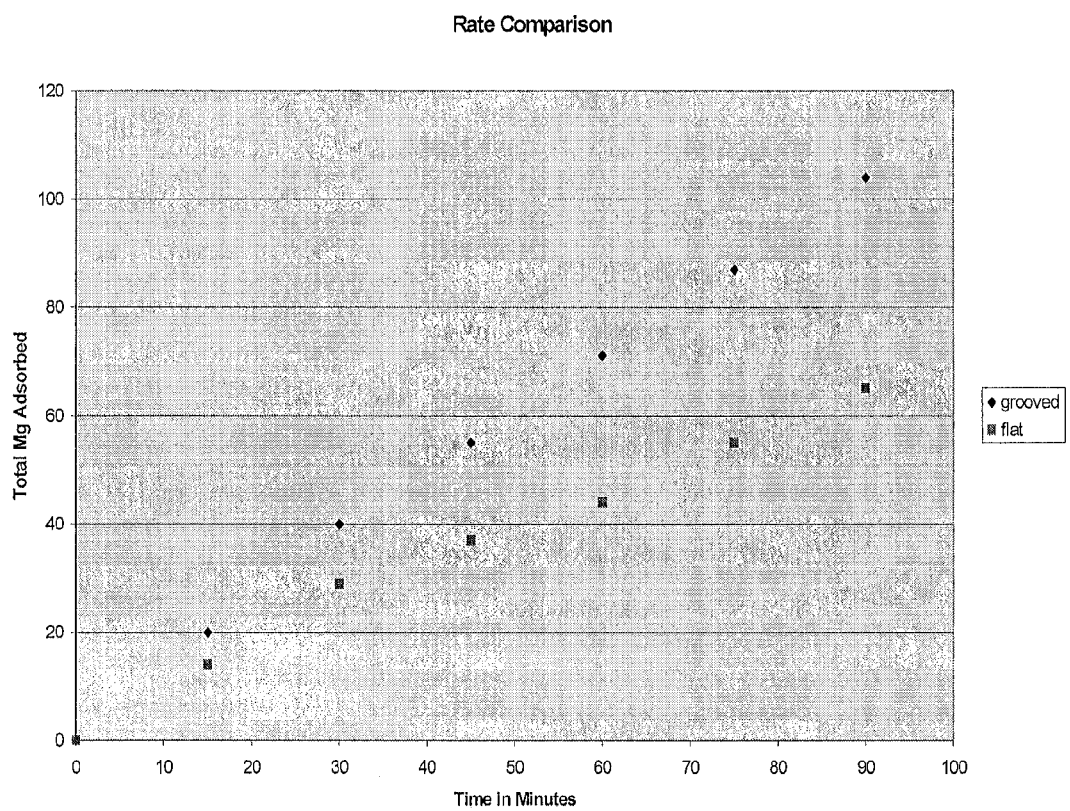
FIG. 20 is a graph depicting the adsorption performance of the inventive grooved adsorbents with adsorbents without grooves.

Samples were made to test adsorption rate performance. Each sample was made using a commercially available double sided acrylic adhesive from Adhesives Research in Glenn Rock, Pa. The adsorbents were all filled PTFE having 240 mg of activated carbon and made in accordance to U.S. Pat. No. 4,895,296. The adsorbent layers were further compressed to form 15 mil (0.38 mm) deep grooves as described in the detailed description section of this patent. The filter layers were 0.2 micron rated PTFE membranes as made and supplied in finished filter form by W. L. Gore and Associates in Newark, Del. The following configurations were tested: Comparative Example 1 was similar to FIG. 18 except the adsorbent layer was flat without grooves; Inventive Example 1 was similar to FIG. 18 and had bottom grooves. The filters were tested for adsorption rate as described above. The results are contained in Table 2 and graphically reported in FIG. 20.

TABLE 2

| Time | Comparative Ex Weight Gain | Comparative Ex Wt Gain/ Unit Time | Inventive Ex Weight Gain | Inventive Ex Wt Gain/Unit |
|---|---|---|---|---|
| 0 min | 0 mg | 0 mg/hr | 0 mg | 0 mg/hr |
| 15 min | 14 mg | 57 mg/hr | 20 mg | 78 mg/hr |
| 30 min | 29 mg | 58 mg/hr | 40 mg | 80 mg/hr |
| 45 min | 37 mg | 49 mg/hr | 55 mg | 73 mg/hr |
| 60 min | 44 mg | 44 mg/hr | 71 mg | 71 mg/hr |
| 75 min | 55 mg | 44 mg/hr | 87 mg | 70 mg/hr |
| 90 min | 65 mg | 43 mg/hr | 104 mg | 69 mg/hr |
| 105 min | 65 mg | N/A | 104 mg | N/A |
| 120 min | 65 mg | N/A | 104 mg | N/A |

The results show that adding grooves to the bottom of an adsorbent assembly can improve the adsorbed weight per unit time or the adsorption rate of the adsorbent assembly.

While particular embodiments of the present invention have been illustrated and described herein, the present invention should not be limited to such illustrations and descriptions. It should be apparent that changes and modifications may be incorporated and embodied as part of the present invention within the scope of the following claims:

The invention claimed is:

1. An adsorbent assembly for removing contaminants within an enclosure comprising:
   a) an adhesive;
   b) an adsorbent media having a bottom surface adjacent to said adhesive, a top surface, and at least one side surface; and
   c) a filter media covering the adsorbent, wherein the filter media is adjacent to the top surface and at least one side surface of said adsorbent media and said adsorbent media includes at least one groove in the top surface of said adsorbent media.

2. The adsorbent assembly of claim 1, wherein the filter media comprises a porous polymeric membrane.

3. The adsorbent assembly of claim 2, in which the filter media is hydrophobic.

4. The adsorbent assembly of claim 2, wherein the filter media comprises PTFE.

5. The adsorbent assembly of claim 2, further comprising an electret particle filtering layer disposed on the porous polymeric membrane.

6. The adsorbent assembly of claim 1, wherein the filter media comprises an electret filter media.

7. The adsorbent assembly of claim 1, in which the adsorbent media comprises PTFE and an adsorbent material.

8. The adsorbent assembly of claim 7, in which the adsorbent media comprises a PTFE membrane filled with an adsorbent material.

9. The adsorbent assembly of claim 1, in which the adsorbent media is molded.

10. The adsorbent assembly of claim 1, in which the adsorbent media is a non-woven fabric impregnated with an adsorbent.

11. The adsorbent assembly of claim 1, in which the adsorbent media is a granular material disposed on at least one side of a fiber scrim.

12. The adsorbent assembly of claim 1, in which the adsorbent media comprises a physisorbent.

13. The adsorbent assembly of claim 12, in which the physisorbent is selected from the group consisting of activated carbon; activated alumina; molecular sieves; silica gel and combinations thereof.

14. The adsorbent assembly of claim 1, in which the adsorbent media comprises a chemisorbent.

15. The adsorbent assembly of claim 14, in which the chemisorbent is a material impregnated with at least one material selected from the group consisting of potassium permanganate, calcium carbonate, potassium carbonate, potassium hydroxide, sodium carbonate, and calcium sulfate; and combinations thereof.

16. The adsorbent article of claim 1, in which said at least one groove is adjacent to the filter media.

17. The adsorbent assembly of claim 16, wherein said at least one groove is on a side surface of the adsorbent media.

18. The adsorbent assembly of claim 16, wherein said at least one groove is on the top surface of the adsorbent media.

19. The adsorbent assembly of claim 1, in which the adsorbent media further comprises at least one groove on the bottom surface.

20. The adsorbent assembly of claim 1, in which the adsorbent assembly includes two or more grooves on any one surface.

21. The adsorbent assembly of claim 20, wherein the grooves are parallel.

22. The adsorbent assembly of claim 20, in which the grooves form a radial pattern.

23. The adsorbent assembly of claim 20, in which the grooves intersect.

24. The adsorbent assembly of claim 1, in which the at least one groove is at least about 1 mil deep.

25. The adsorbent assembly of claim 1, in which the at least one groove is at least about 5 mils deep.

26. The adsorbent assembly of claim 1, in which the at least one groove is at least about 10 mils deep.

27. The adsorbent assembly of claim 1, further comprising a groove around the perimeter of the top surface of the adsorbent.

28. The adsorbent assembly of claim 1 further comprising an impermeable layer in a substantially laminar relationship with said filter media, said adsorbent assembly being mounted to the outside of said enclosure.

29. An adsorbent breather assembly for removing contaminants within an enclosure having a fluid inlet/outlet port comprising:
   a) an adhesive;
   b) an adsorbent media having a bottom surface, a top surface, and at least one side surface, the adsorbent media in fluid communication with the fluid inlet/outlet port; and
   c) a filter media covering the adsorbent,
wherein the filter media is adjacent to the top surface and at least one side surface of the adsorbent media and the adsorbent media includes at least one groove adjacent to the filter media.

30. The adsorbent breather assembly of claim 29, in which the bottom surface is adjacent to a layer of adhesive.

31. The adsorbent breather assembly of claim 29, wherein the filter media comprises a porous polymeric membrane.

32. The adsorbent breather assembly of claim 31, in which the filter media is hydrophobic.

33. The adsorbent breather assembly of claim 31, wherein the filter media comprises PTFE.

34. The adsorbent breather assembly of claim 31, further comprising an electret particle filtering layer disposed on the porous polymeric membrane.

35. The adsorbent breather assembly of claim 29, wherein the filter media comprises an electret filter media.

36. The adsorbent breather assembly of claim 29 in which the adsorbent media comprises PTFE and an adsorbent material.

37. The adsorbent breather assembly of claim 36, in which the adsorbent media comprises a PTFE membrane filled with an adsorbent material.

38. The adsorbent breather assembly of claim 29, in which the adsorbent media is molded.

39. The adsorbent breather assembly of claim 29, in which the adsorbent media is a non-woven fabric impregnated with an adsorbent material.

40. The adsorbent breather assembly of claim 29, in which the adsorbent media is a granular adsorbent material disposed on at least one side of a fiber scrim.

41. The adsorbent breather assembly of claim 29, in which the adsorbent comprises a physisorbent.

42. The adsorbent breather assembly of claim 29, in which the physisorbent is selected from the group consisting of activated carbon; activated alumina; molecular sieves; silica gel and combinations thereof.

43. The adsorbent breather assembly of claim 29, in which the adsorbent media comprises a chemisorbent.

44. The adsorbent breather assembly of claim 43, in which the chemisorbent comprises a material impregnated with at least one material selected from the group consisting of potassium permanganate, calcium carbonate, potassium carbonate, potassium hydroxide, sodium carbonate and calcium sulfate; and combinations thereof.

45. The adsorbent breather assembly of claim 29, wherein said at least one groove is on a side surface of the adsorbent media.

46. The adsorbent breather assembly of claim 29, wherein said at least one groove is on the top surface of the adsorbent media.

47. The adsorbent breather assembly of claim 29, in which the adsorbent media further comprises at least one groove on the bottom surface.

48. The adsorbent breather assembly of claim 29, in which the adsorbent media includes two or more grooves on any surface.

49. The adsorbent breather assembly of claim 48, wherein the grooves are parallel.

50. The adsorbent breather assembly of claim 48, in which the grooves form a radial pattern.

51. The adsorbent breather assembly of claim 48, in which the grooves intersect.

52. The adsorbent breather assembly of claim 29, further comprising a diffusion channel defined within the assembly, the diffusion channel adapted to define a pathway for fluid communication between the port and the adsorbent.

53. The adsorbent breather assembly of claim 29, further comprising a diffusion channel in fluid communication with the port and the adsorbent media.

54. The adsorbent breather assembly of claim 29, in which the at least one groove is at least about 1 mil deep.

55. The adsorbent breather assembly of claim 29, in which the at least one groove is at least about 5 mil deep.

56. The adsorbent breather assembly of claim 29, in which the at least one groove is at least about 10 mil deep.

57. The adsorbent breather assembly of claim 29, further comprising a groove around the perimeter of the top surface of the adsorbent.

58. The adsorbent breather assembly of claim 29, in which the adhesive is selected from the group consisting of at least: pressure sensitive adhesives, UV cured adhesives, hot-melt adhesives, ultrasonically activated polymers, cold temperature adhesives and epoxies.

59. The adsorbent breather assembly of claim 29 which further comprises an impermeable layer and is mounted to the outside of the enclosure instead of to the inside of the enclosure.

60. The adsorbent breather assembly of claim 59, further comprising a diffusion channel adapted to define a pathway for fluid communication between the port and the adsorbent.

61. A method of removing contaminants from an enclosure comprising the steps of:
a) providing an enclosure defining a sealed volume and having a fluid inlet port;
b) providing an adsorbent having a bottom surface adjacent to the enclosure, a top surface opposite the bottom surface and at least one side surface, the adsorbent in fluid communication with the fluid inlet port and the sealed volume; and
c) covering at least the top surface and a side surface of the adsorbent with a filter media,
wherein the adsorbent includes at least one groove adjacent to the filter media.

62. An adsorbent assembly for removing contaminants within an enclosure comprising:
a) an adhesive;
b) an adsorbent media having a bottom surface adjacent to said adhesive, a top surface opposite the bottom surface, and at least one side surface; and
c) a filter media adjacent to the top surface and covering the adsorbent, wherein at least one side surface of said adsorbent media media includes at least one groove in the side surface of said adsorbent media.

63. An adsorbent assembly for removing contaminants within an enclosure comprising:
a) an adhesive;
b) an adsorbent media having a bottom surface adjacent to said adhesive, a top surface opposite the bottom surface, and at least one side surface; said adsorbent media comprising a first layer having at least one groove and a second layer adjacent to the first layer, the first and second layers positioned such that the at least one groove of the first layer is adjacent to the second layer,
c) a filter media adjacent to the top surface of said adsorbent media.

64. An adsorbent breather assembly for removing contaminants within an enclosure having a fluid inlet/outlet port comprising:
a) an adhesive;
b) an adsorbent media comprising two or more layers, said media having a bottom surface, a top surface, and at least one side surface, the adsorbent media in fluid communication with the fluid inlet/outlet port; and
c) a filter media covering the adsorbent adjacent to the top surface and at least one side surface of the adsorbent media and said adsorbent media includes a first layer having at least one groove and a second layer adjacent to the first grooved adsorbent layer, the first and second adsorbent layers positioned such that the at least one groove of the first layer is adjacent to the second layer.

65. The adsorbent breather assembly of claim 64 in which the first and second layers include grooves and the first and second layers are positioned such that the grooves of the first layer are adjacent to the second layer and the grooves of the second layer are on a surface opposite the first layer.

66. The adsorbent breather assembly of claim 64, in which the second layer includes at least one groove and the first and second layers are positioned such that the at least one groove of the first layer faces the at least one groove of the second layer.

* * * * *